United States Patent
Damnjanovic et al.

(10) Patent No.: US 10,143,015 B2
(45) Date of Patent: Nov. 27, 2018

(54) CONTENTION-BASED RANDOM ACCESS IN UNLICENSED SPECTRUM

(71) Applicant: QUALCOMM Incorporated, San Diego, CA (US)

(72) Inventors: Aleksandar Damnjanovic, Del Mar, CA (US); Qingsi Wang, San Diego, CA (US); Vikas Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 15/461,181

(22) Filed: Mar. 16, 2017

(65) Prior Publication Data

US 2017/0273108 A1  Sep. 21, 2017

Related U.S. Application Data

(60) Provisional application No. 62/310,485, filed on Mar. 18, 2016.

(51) Int. Cl.
*H04W 74/08* (2009.01)
*H04W 28/02* (2009.01)
(Continued)

(52) U.S. Cl.
CPC ....... *H04W 74/085* (2013.01); *H04L 27/2602* (2013.01); *H04W 28/0278* (2013.01); *H04W 64/00* (2013.01); *H04W 74/0833* (2013.01)

(58) Field of Classification Search
None
See application file for complete search history.

(56) References Cited

U.S. PATENT DOCUMENTS

2014/0098761 A1   4/2014   Lee et al.
2015/0341950 A1*  11/2015  Pang ................ H04W 72/1263
                                                          370/329
(Continued)

FOREIGN PATENT DOCUMENTS

WO   WO-2007029977 A1   3/2007
WO   WO-2016137948 A1   9/2016
WO   WO-2016144481 A1   9/2016

OTHER PUBLICATIONS

International Search Report and Written Opinion issued in International Patent Application No. PCT/US2017/023033, dated Jun. 22, 2017 (15 pages).

(Continued)

*Primary Examiner* — Ajit Patel
(74) *Attorney, Agent, or Firm* — Arent Fox LLP

(57) ABSTRACT

The disclosure provides a method and system for requesting access to resources for uplink communications in unlicensed spectrum. In particular, a user equipment (UE) may detect one or more of a first type of data or a second type of data to be transmitted to a base station (BS). The UE may then determine if a first type of physical random access channel (PRACH) resource is available for transmitting one or more of the first type of data or the second type of data to the BS. If the first type of PRACH resource is available, then the UE may transmit one or more of the first type of data or the second type of data using the first type of PRACH resource. If the first type of PRACH resource is not available, then the UE may transmit the second type of data using a second type of PRACH resource.

30 Claims, 10 Drawing Sheets

(51) Int. Cl.
*H04W 64/00* (2009.01)
*H04L 27/26* (2006.01)

(56) References Cited

U.S. PATENT DOCUMENTS

2016/0366704 A1* 12/2016 Lee .................. H04W 72/0413
2017/0265223 A1* 9/2017 Zhang ................ H04W 72/02
2017/0280484 A1* 9/2017 Awad ................ H04W 74/006

OTHER PUBLICATIONS

Kim., et al., "Adaptive Random Access Preamble Split in LTE", 9th International Wireless Communications and Mobile Computing Conference, IEEE, Jul. 1, 2013, XP032478502, DOI: 10.1109/IWCMC.2013.6583662, ISBN: 978-1-4673-2479-3, pp. 814-819.
NTT Docomo et al., "Discussion on PRACH for eLAA UL," 3GPP TSG RAN WG1 Meeting #84, R1-160950, Feb. 14, 2016, XP051054258, Retrieved from the Internet: URL:http://www.3gpp.org/ftp/Meetings_3GPP_SYNC/RAN1/Docs/, 5 pages.

* cited by examiner

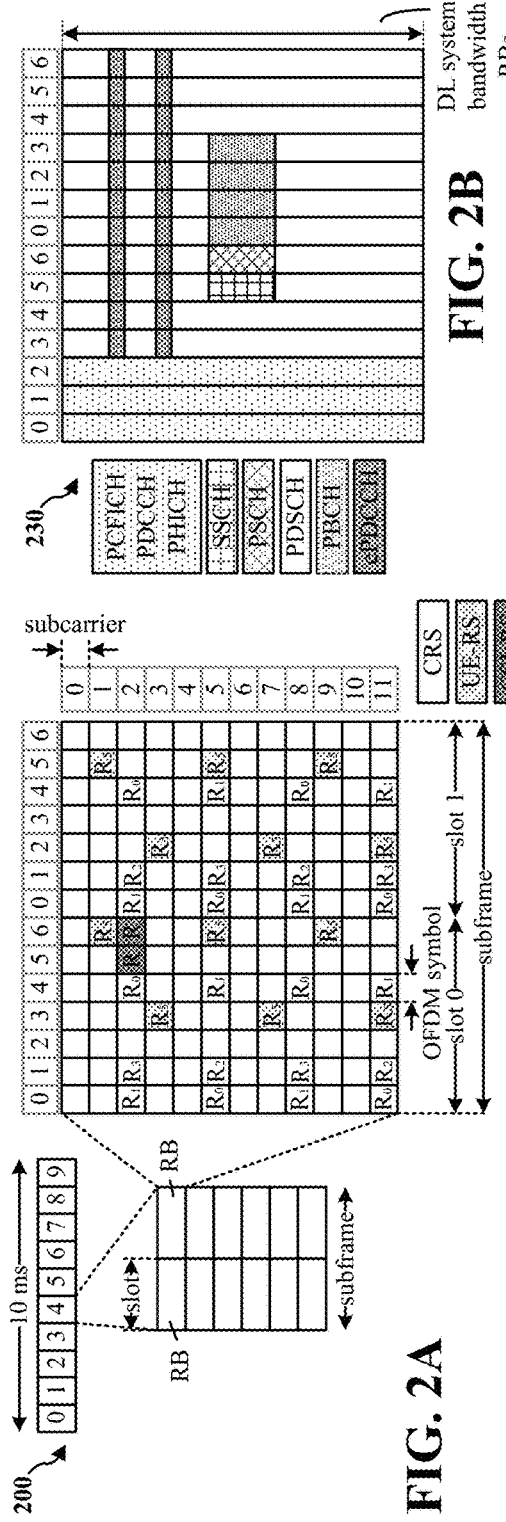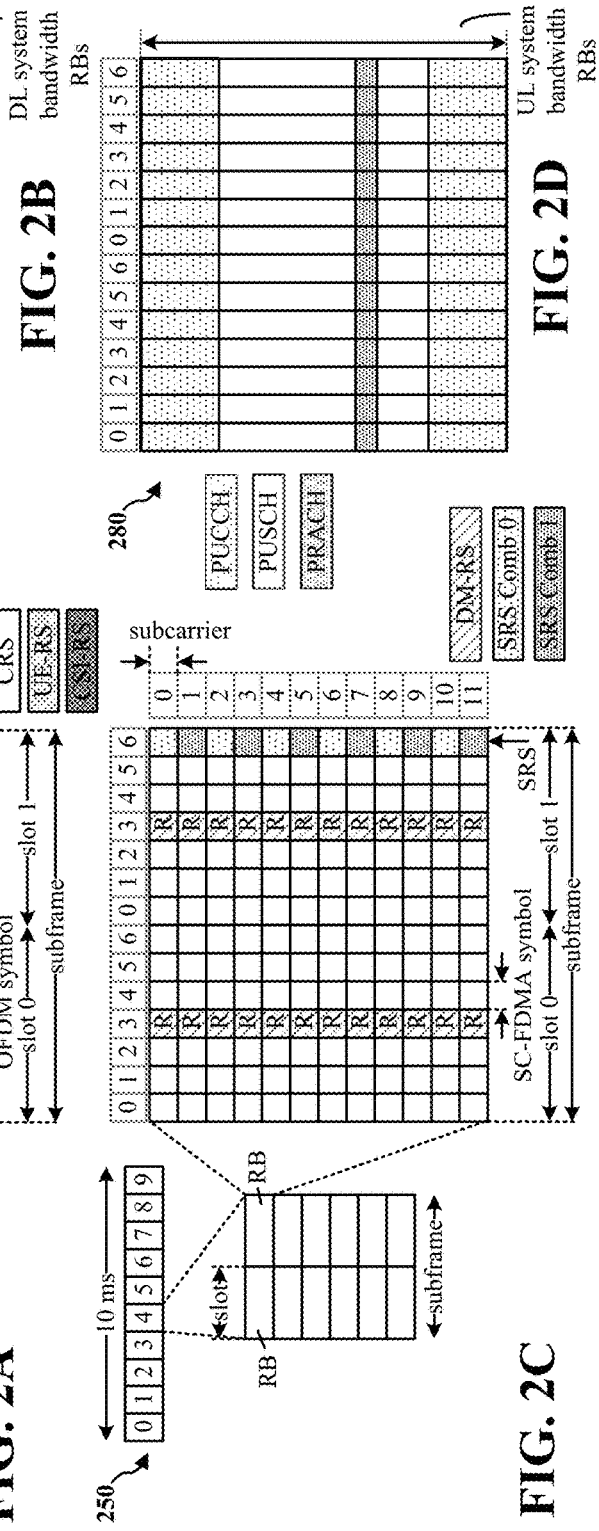
FIG. 2A  FIG. 2B  FIG. 2C  FIG. 2D

CONTENTION-BASED RANDOM ACCESS IN UNLICENSED SPECTRUM

CLAIM OF PRIORITY UNDER 35 U.S.C. § 119

The present Application for Patent claims priority to U.S. Provisional Application No. 62/310,485 entitled "CONTENTION-BASED RANDOM ACCESS IN UNLICENSED SPECTRUM" filed Mar. 18, 2016, which is assigned to the assignee hereof and expressly incorporated by reference herein.

BACKGROUND

The present disclosure relates generally to wireless communication systems, and more particularly, to techniques for contention-based random access in unlicensed spectrum.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In LTE, an evolved Node B (eNB) allocates dedicated physical random access channel (PRACH) resources to each user equipment (UE) listening for a transmission from the eNB on a communication channel. Each UE may then use the dedicated PRACH resource to transmit data to the eNB on the communication channel. However, if the eNB does not have any downlink traffic to transmit and/or the eNB is not aware of UEs located in a cell of the eNB, then the eNB may not allocate dedicated PRACH radio resources to the UEs. As a result, each UE may not be able to access the communication channel. Accordingly, techniques that allow for such access by allocating the appropriate resources are desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, the present disclosure provides for a method of wireless communication that includes detecting, by a user equipment (UE), at least one of a first type of data or a second type of data to be transmitted from the UE to a base station (BS) over a channel. The method further includes determining, by the UE, if a first type of physical random access channel (PRACH) resource is available for transmitting at least one of the first type of data or the second type of data to the BS. In addition, the method includes transmitting at least one of the first type of data or the second type of data using the first type of PRACH resource based at least in part on determining the first type of PRACH resource is available. Furthermore, the method includes transmitting the second type of data using a second type of PRACH resource based at least in part on determining the first type of PRACH resource is not available.

In accordance with another aspect, the present disclosure provides for a method of wireless communication that includes receiving, over a PRACH, data from a UE, wherein the PRACH includes at least one orthogonal frequency division multiplexing (OFDM) symbol. The method further includes estimating a number of OFDM symbols of the PRACH. In addition, the method includes decoding the PRACH based at least in part on the estimated number of OFDM symbols.

In accordance with another aspect, the present disclosure provides an apparatus (e.g., a UE) for wireless communication, the apparatus including a transceiver, memory configured to store instructions, and one or more processors communicatively coupled to detect at least one of a first type of data or a second type of data to be transmitted to a BS over a channel, to determine if a first type of PRACH resource is available for transmitting at least one of the first type of data or the second type of data to the BS, to transmit at least one of the first type of data or the second type of data using the first type of PRACH resource based at least in part on determining the first type of PRACH resource is available, and to transmit the second type of data using a second type of PRACH resource based at least in part on determining the first type of PRACH resource is not available. A resource control component operating on the apparatus may be configured to perform the wireless communication and one or more of the detecting, determining, and transmitting operations associated with the apparatus.

In accordance with another aspect, the present disclosure provides an apparatus (e.g., a BS) for wireless communication, the apparatus including a transceiver, memory configured to store instructions, and one or more processors communicatively coupled to receive, over a PRACH, data from a UE, wherein the PRACH includes at least one OFDM symbol, to estimate a number of OFDM symbols of the PRACH, and to decode the PRACH based at least in part on the estimated number of OFDM symbols. A communicating component operating on the apparatus may be configured to perform the wireless communication and one or more of the receiving, estimating, and decoding associated with the apparatus.

In accordance with another aspect, the present disclosure provides an apparatus (e.g., a UE) for wireless communication, the apparatus including means for detecting at least one of a first type of data or a second type of data to be transmitted to a BS over a channel. The apparatus further includes means for determining if a first type of PRACH resource is available for transmitting at least one of the first type of data or the second type of data to the BS. In addition, the apparatus includes means for transmitting at least one of the first type of data or the second type of data using the first type of PRACH resource based at least in part on determining the first type of PRACH resource is available. Furthermore, the apparatus includes means for transmitting the second type of data using a second type of PRACH resource based at least in part on determining the first type of PRACH resource is not available.

In accordance with another aspect, the present disclosure provides an apparatus (e.g., a BS) for wireless communication, the apparatus including means for receiving, over a PRACH, data from a UE, wherein the PRACH includes at least one OFDM symbol. The apparatus further includes means for estimating a number of OFDM symbols of the PRACH. Furthermore, the apparatus includes means for decoding the PRACH based at least in part on the estimated number of OFDM symbols.

In accordance with yet another aspect, the present disclosure provides a computer-readable medium (e.g., a non-transitory medium) storing computer executable code, the code including code that when executed by a computer causes the computer to detect at least one of a first type of data or a second type of data to be transmitted to a BS over a channel. The computer-readable medium may further include code that when executed by the computer causes the computer to determine if a first type of PRACH resource is available for transmitting at least one of the first type of data or the second type of data to the BS. In addition, the computer-readable medium may include code that when executed by the computer causes the computer to transmit at least one of the first type of data or the second type of data using the first type of PRACH resource based at least in part on determining the first type of PRACH resource is available. Furthermore, the computer-readable medium may include code that when executed by the computer causes the computer to transmit the second type of data using a second type of PRACH resource based at least in part on determining the first type of PRACH resource is not available.

In accordance with yet another aspect, the present disclosure provides a computer-readable medium (e.g., a non-transitory medium) storing computer executable code, the code including code that when executed by a computer causes the computer to receive, over a PRACH, data from a UE, wherein the PRACH includes at least one OFDM symbol. The computer-readable medium may further include code that when executed by the computer causes the computer to estimate a number of OFDM symbols of the PRACH. Furthermore, the computer-readable medium may include code that when executed by the computer causes the computer to decode the PRACH based at least in part on the estimated number of OFDM symbols.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a downlink (DL) frame structure in accordance with various aspects of the present disclosure.

FIG. 2B is a diagram illustrating an example of DL channels within the DL frame structure in accordance with various aspects of the present disclosure.

FIG. 2C is a diagram illustrating of an uplink (UL) frame structure is accordance with various aspects of the present disclosure.

FIG. 2D is a diagram of an example of UL channels within the UL frame structure in accordance with various aspects of the present disclosure.

DETAILED DESCRIPTION

Figure 1:
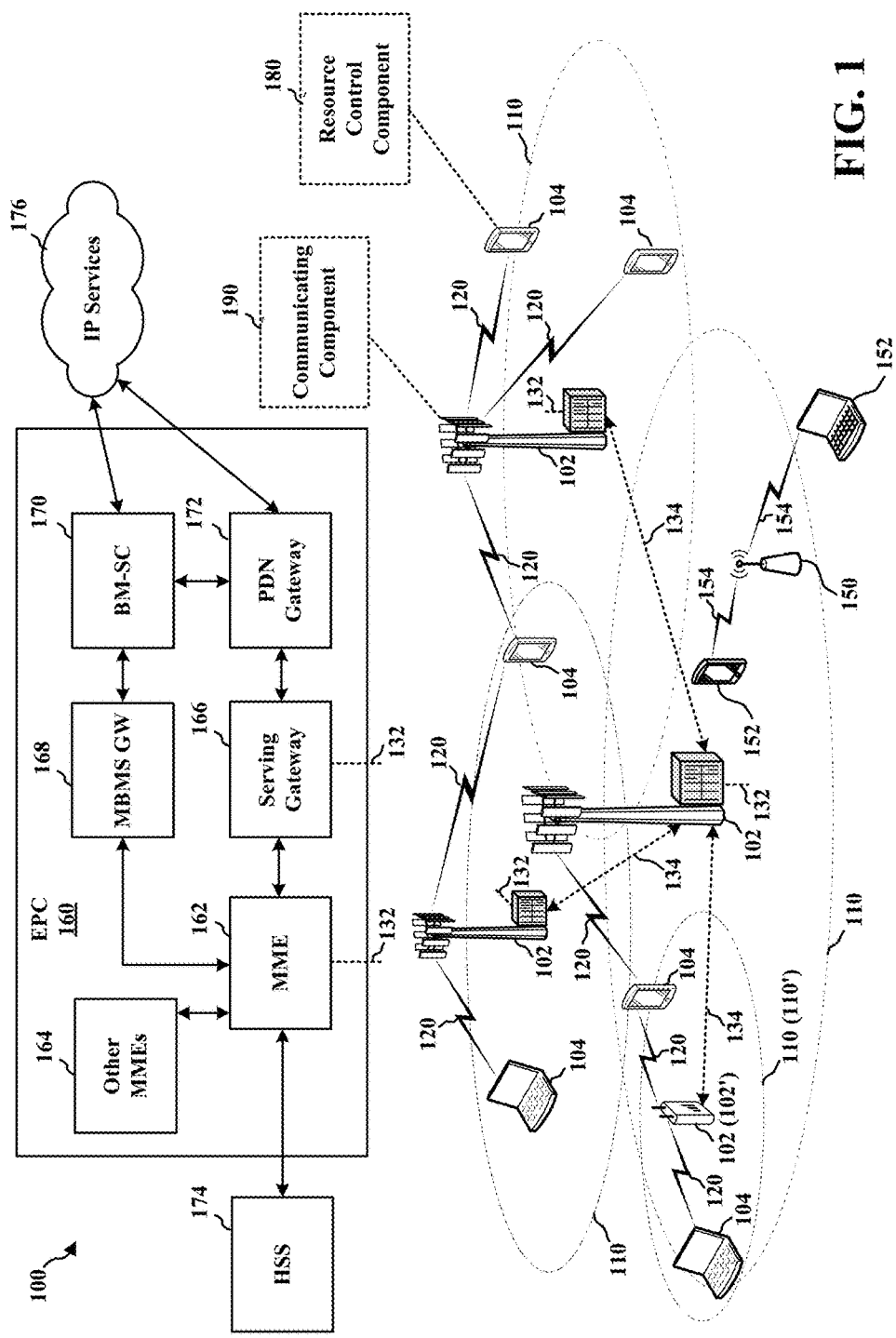
FIG. 1 is a diagram illustrating an example of a wireless communications system and an access network.

The present disclosure relates to performing contention-based random access in unlicensed spectrum. Currently, in LTE, a UE may not able to request access to an unlicensed communication channel for uplink transmissions when an eNB does not allocate dedicated PRACH resources to the UE. For example, the eNB may not allocate dedicated PRACH resources when the eNB does not have any downlink traffic to transmit and/or the eNB is not aware of UEs located in a cell of the eNB.

The present disclosure provides various techniques for requesting access to radio resources for uplink communications in unlicensed spectrum. In particular, a mechanism is provided for allowing a UE to perform contention-based random access on an unlicensed or shared communication channel when an eNB does not allocate uplink resources to the UE. Moreover, a mechanism is provided for limiting a number of occasions that the UE may perform the contention-based random access in order to prevent congestion on the unlicensed communication channel. For example, in an aspect, the UE may contend for access to the unlicensed communication channel in a frequency domain using a first uplink resource, if the eNB allocated the first uplink resource. However, if the eNB did not allocate the first uplink resource, then the UE may contend for access to the unlicensed communication channel in a time domain using a second uplink resource of variable size. In an aspect, the UE may continuously check whether an eNB allocates the first uplink resource and transmits on the allocated uplink resource if and when the allocated uplink resource becomes available. In an aspect, the eNB may estimate a size of one or more physical channels received from the UE and decode the one or more received physical channels based on the estimated size.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an example of a wireless communications system 100 including an access network. The wireless communications system 100 (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells, any of which may be referred to as Home eNBs or simply an eNB.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more base stations 102, e.g., a macro base station. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system 100 may further include a Wi-Fi access point (AP) 150 in communication with Wi-Fi stations (STAs) 152 via communication links 154 in an unlicensed frequency spectrum, such as the 5 GHz unlicensed frequency spectrum. When communicating in an unlicensed frequency spectrum, the STAs 152/AP 150 may perform a clear channel assessment (CCA), sometimes referred to as a listen-before-talk (LBT) mechanism, prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire (when in a standalone unlicensed spectrum operation). The unlicensed frequency spectrum may also be referred to as a shared frequency spectrum.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is a control node that processes the signaling between the UEs 104 and the EPC 160. Generally, the MME 162 provides bearer and connection management. All user Internet protocol (IP) packets are transferred through the Serving Gateway 166, which itself is communicatively coupled with the PDN Gateway 172. The PDN Gateway 172 provides UE IP address allocation as well as other functions. The PDN Gateway 172 and the BM-SC 170 are communicatively coupled with the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, an access point, a base transceiver station, a radio base station, a radio transceiver, a transceiver function, a basic service set (BSS), an extended service set (ESS), or some other suitable terminology. The base staton 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to limit occasions when the UE 104 performs contention-based access to an unlicensed communications channel. In an aspect, the UE 104 may first determine whether the eNB 102 has scheduled a first type of ePRACH resource for uplink communications. If so, then the UE 104 may transmit a first type of data or a second type of data to the eNB 102 using the first type of ePRACH resource (see e.g., FIG. 5). Otherwise, the UE 104 may schedule a second type of ePRACH resource and transmit a second type of data using the second type of ePRACH resource (see e.g., FIG. 6). However, the UE 104 may be configured to limit a number of transmissions using the second type of ePRACH resource in order to prevent congestion on the unlicensed communications channel. In an aspect, the eNB 102 may be configured to blindly decode ePRACH transmissions received from one or more UEs 104.

Figure 4:
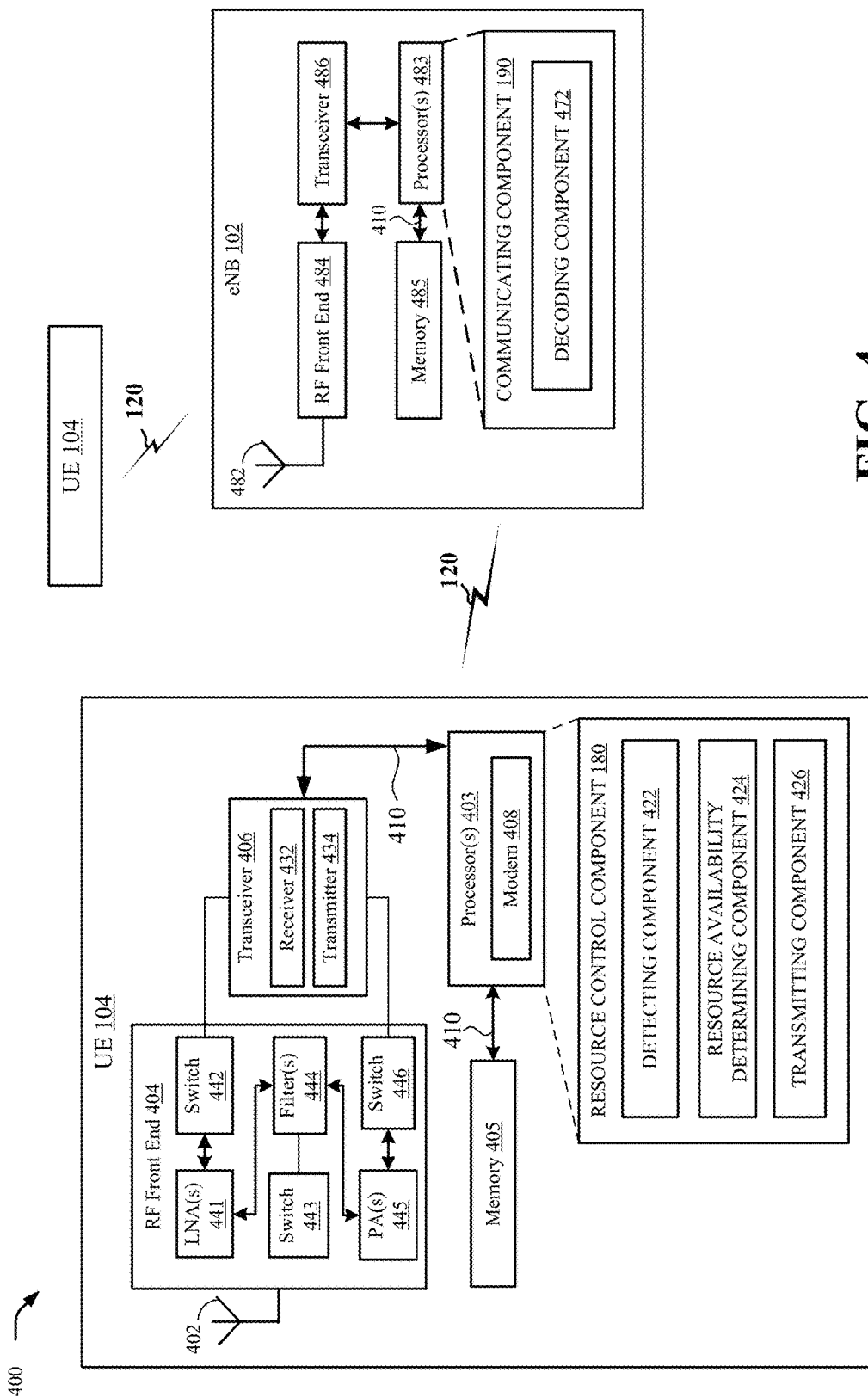
FIG. 4 is a simplified block diagram of several sample aspects of a communication system.

In an aspect, the UE 104 may include a resource control component 180 (see details in FIG. 4). The resource control component 180, or one or more of subcomponents of the resource control component 180, may detect at least one of a first type of data or a second type of data to be transmitted from the UE 104 to the eNB 102. The resource control component 180, or one or more of subcomponents of the resource control component 180, may determine if a first type of uplink resource (e.g., a Type I ePRACH resource (FIG. 5)) is available for transmitting at least one of the first type of data or the second type of data to the eNB 102. The resource control component 180, or one or more of subcomponents of the resource control component 180, may then transmit (e.g., via a transceiver) the at least one of the first type of data or the second type of data using the first type of uplink resource based at least in part on determining the first type of uplink resource is available. The resource control component 180, or one or more of subcomponents of resource control component 180, may transmit (e.g., via a transceiver) the second type of data using a second type of uplink resource (e.g., Type II ePRACH resource (FIG. 6)) based at least in part on determining the first type of uplink resource is not available.

In an aspect, the eNB 102 may include a communicating component 190 (see details in FIG. 4). The communicating component 190, or one or more of the subcomponents of the communicating component 190, may receive data transmitted from one or more UEs 104 using one or more of a first type of uplink resource or a second type of uplink resource (e.g., a Type I ePRACH (FIG. 5) or Type II ePRACH (FIG. 6)). The communicating component 190, or one or more of subcomponents of the communicating component 190, may estimate a number of orthogonal frequency division multiplexing (OFDM) symbols included in the Type I ePRACH or the Type II ePRACH transmission. The communicating component 190, or one or more of subcomponents of the communicating component 190, may then decode the Type I ePRACH or the Type II ePRACH based at least in part on the estimated number of OFDM symbols.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. These frame structures and/or channels are provided by way of illustration and not limitation, and it is to be understood that other wireless communication technologies may have a different frame structure and/or different channels. In LTE, a frame (e.g., 10 ms) may be divided into 10 equally sized sub-frames. Each sub-frame may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive sub-carriers in the frequency domain and 7 consecutive symbols (for DL, OFDM symbols; for UL, SC-FDMA symbols) in the time domain, for a total of 84 REs. For an extended cyclic prefix, an RB contains 12 consecutive sub-carriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

Diagram 230 in FIG. 2B illustrates an example of various channels within a DL sub-frame of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within sub-frames 0 and 5 of a frame, and carries a primary synchronization signal (PSS) that is used by a UE to determine sub-frame timing and a physical layer identity. The secondary synchronization channel (SSCH) is within symbol 5 of slot 0 within sub-frames 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of sub-frame 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a sub-frame. The SRS may have a comb structure, and a UE may transmit SRS on one of the combs. The SRS may be used by an eNB for channel quality estimation to enable frequency-dependent scheduling on the UL.

Diagram 280 in FIG. 2D illustrates an example of various channels within an UL sub-frame of a frame. FIG. 2D may illustrate a case where the UE 104 (FIG. 1) is transmitting in licensed spectrum, or a case where no interference is detected in unlicensed spectrum. A PRACH may be within one or more sub-frames within a frame based on the PRACH configuration. The PRACH (e.g., a Type I ePRACH (FIG. 5)) may include six consecutive RB pairs (e.g., 14 consecutive OFDM symbols) within a sub-frame. The PRACH (e.g., a Type II ePRACH (FIG. 6)) may, alternatively, include one or more non-consecutive and/or consecutive OFDM symbols within a sub-frame. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
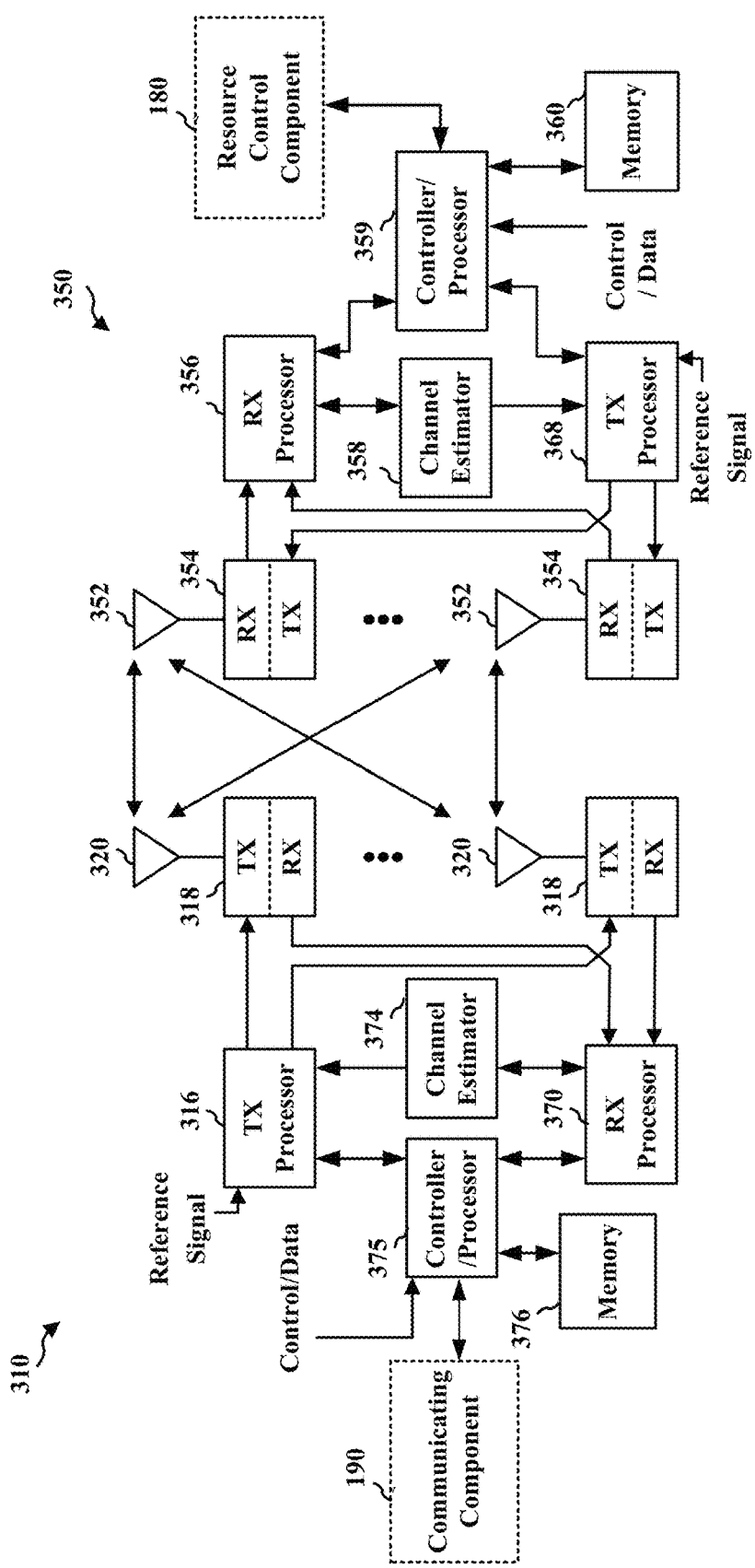
FIG. 3 is a diagram illustrating an example of an evolved Node B (eNB) and user equipment (UE) in an access network.

FIG. 3 is a block diagram of an eNB 310 in communication with a UE 350 in an access network. The eNB 310 may be an example of the eNB 102 (FIG. 1, FIG. 4) and the UE 350 may be an example of the UE 104 (FIG. 1, FIG. 4). In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization. The communicating component 190 in eNB 310, which may be implemented by one or more of the processors in eNB 310, may manage transmission of uplink channels by providing signaling (e.g., RRC connection modification) to assign uplink resources (e.g., sub-bands) to the UE 350.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC)

coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM sub-carrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through a respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each sub-carrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. In an aspect, the resource control component 180 in UE 350, which may be implemented by one or more of the processors in UE 350, may further use assignments received from the eNB 310 to select resources (e.g., sub-bands) and the appropriate modulation and coding schemes (MCSs). The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through a respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

FIG. 4 illustrates a diagram 400 including an example of a UE 104 in communication with an eNB 102. In an aspect, the eNB 102 and the UE 104 may apply LTE techniques to operate in unlicensed spectrum. For example, an uplink transmission band may be in unlicensed spectrum. In an aspect, the eNB 102 may schedule uplink transmissions for the UE 104. For example, the eNB 102 may transmit assignments indicating resources (e.g., Type I ePRACH resources (FIG. 5)) for the UE 104 to use for an uplink transmission in an uplink sub-frame. In another aspect, the eNB 102 may not have any downlink traffic to transmit and/or may not be aware of any UEs (e.g., UE 104) located in a cell (e.g., small cell 102' (FIG. 1)) of the eNB 102. In this case, the eNB 102 may not schedule uplink transmissions for the UE 104 and the UE 104 may contend for resources (e.g., Type II ePRACH resources (FIG. 6)) to use for an uplink transmission in an uplink sub-frame. The teachings herein may be applicable to other types of apparatuses or other similar apparatuses that are referenced using other terminology. For example, in various implementations, eNBs 102 may be referred to or implemented as access points, base stations, NodeBs, Home NodeBs, Home eNodeBs, small cells, macro cells, femto cells, and so on, while UEs 104 may be referred to or implemented as access terminals, mobile stations, and so on.

According to the present aspects, the UE 104 may include one or more processors 403 that may operate in combination with a resource control component 180 for managing transmission of uplink physical channels based on an availability of resources (e.g., Type I ePRACH resources (FIG. 5) and/or Type II ePRACH resources (FIG. 6)). The resource control component 180 may include hardware, firmware, and/or software code executable by a processor 403 for transmitting uplink physical channels during one or more time periods (e.g., sub-frames) based on the availability of resources, the code comprising instructions and being stored in a memory 405 (e.g., computer-readable medium). The processor 403 may be communicatively coupled with the transceiver 406 and the memory 405 via a bus 410. The resource control component 180 may include a detecting component 422 for detecting at least one of a first type of data or a second type of data to be transmitted from the UE 104 to an eNB 102. The resource control component 180 may include a resource availability determining component 424 for determining if a first type of PRACH resource (e.g., Type I ePRACH resource (FIG. 5)) is available for transmitting at least one of the first type of data or the second type of data. The resource control component 180 may include a transmitting component 426 for transmitting at least one of the first type of data or the second type of data using the first type of PRACH resource based at least in part on determining the first type of PRACH resource is available, and transmitting the second type of data using a second type of PRACH resource (e.g., Type II ePRACH resource (FIG. 6)) based at least in part on determining the first type of PRACH resource is not available. In an aspect, the term "component" as used herein may be one of the parts that make up a system, may be hardware or software, and may be divided into other components.

A receiver 432 may include hardware, firmware, and/or software code executable by a processor (e.g. a processor, controller, or other hardware entity of transceiver 406) for receiving data, the code comprising instructions and being stored in a memory (e.g., computer-readable medium). The receiver 432 may be, for example, a radio frequency (RF) receiver. In an aspect, the receiver 432 may receive signals transmitted by the eNB 102. The receiver 432 may obtain measurements of the signals. For example, the receiver 432 may determine Ec/Io, SNR, etc.

A transmitter 434 may include hardware, firmware, and/or software code executable by a processor (e.g. a processor, controller, or other hardware entity of transceiver 406) for transmitting data, the code comprising instructions and being stored in a memory (e.g., computer-readable medium). The transmitter 434 may be, for example, a RF transmitter.

In an aspect, the one or more processors 403 can include one or more modem processors that provide a modem 408. The various functions related to uplink scheduling and transmission may be included in modem 408 and/or processors 403 and, in an aspect, can be executed by a single processor, while in other aspects, different ones of the functions may be executed by a combination of two or more different processors. For example, in an aspect, the one or more processors 403 may include any one or any combination of a modem processor, or a baseband processor, or a digital signal processor, or a transmit processor, or a transceiver processor associated with transceiver 406. In particular, the one or more processors 403 may implement components included in resource control component 180, including the detecting component 422, the resource availability determining component 424, and the transmitting component 426. Moreover, the modem 408 and the one or more processors 403 may correspond to one or more of the processors of UE 350 (FIG. 3). For example, the one or more processors 403 may correspond to one or more of receive processor 356, transmit processor 368, or controller/processor 359 of UE 350 (FIG. 3).

The detecting component 422 may include hardware, firmware, and/or software code executable by a processor (e.g., processor(s) 403) for detecting at least one of a first type of data or a second type of data to be transmitted from the UE 104 to a base station (e.g., eNB 102), the code comprising instructions and being stored in a memory (e.g., memory 405 or another computer-readable medium).

The resource availability determining component 424 may include hardware, firmware, and/or software code executable by a processor (e.g., processor(s) 403) for determining if a first type of PRACH resource is available for transmitting at least one of a first type of data or a second type of data to a base station (e.g., eNB 102), the code comprising instructions and being stored in a memory (e.g., memory 405 or another computer-readable medium). In an aspect, for example, the resource availability determining component 424 may determine if an uplink resource assignment identifying ePRACH resources within the UL frequency band for transmitting uplink communications has been received from the base station (e.g., eNB 102). For example, the detecting component 422 may include or control an antenna 402, RF front end 404, and/or receiver 432 to determine if the uplink resource assignment has been received from the base station (e.g., eNB 102). If the uplink resource assignment has been received from the base station (e.g., eNB 102), then the resource availability determining component 424 may determine the first type of PRACH resource is available for transmitting at least one of the first type of data or the second type of data.

The transmitting component 426 may include hardware, firmware, and/or software code executable by a processor (e.g., processor(s) 403) for transmitting at least one of a first type of data or a second type of data using the first type of PRACH resource (e.g., Type I PRACH resource (FIG. 5)) and transmitting the second type of data using the second type of PRACH resource (e.g., Type II PRACH resource (FIG. 6)), the code comprising instructions and being stored in a memory (e.g., memory 405 or another computer-readable medium). For example, the transmitting component 426 may include or control the transmitter 434 for performing the uplink transmission 454. In an aspect, the transmitting component 426 may determine to transmit at least one of the first type of data or a second type of data using the first type of PRACH resource when the resource availability determining component 424 determines the first PRACH resource is available. In an aspect, the transmitting component 426 may determine a transmission size of the first PRACH resource (e.g., a size of data to be transmitted) based on the uplink resource assigned by eNB 102. In an alternative, or additional, aspect, the transmitting component 426 may determine to transmit the second type of data using the second type of PRACH resource when the resource availability determining component 424 determines the first type of PRACH resource is not available (e.g., UE 104 has not received an uplink resource assignment from eNB 102). In an aspect, the transmitting component 426 may determine a transmission size of the second type of PRACH resource based on a location of the UE 104 in a cell of the base station (e.g., eNB 102). Furthermore, in an aspect, the transmitting component 426 may limit a frequency of transmissions on the second type of PRACH resource.

Moreover, in an aspect, the UE 104 may include an RF front end 404 and a transceiver 406 for receiving and transmitting radio transmissions. For example, the transceiver 406 may receive a signal that includes a physical downlink control channel (PDCCH) or physical downlink shared channel (PDSCH) from the eNB 102. The transceiver 406 may demodulate the received signal to obtain an uplink assignment. Further, the transceiver 406 may transmit the uplink physical channels via the RF front end 404.

The RF front end 404 may be communicatively coupled with one or more antennas 402 and can include one or more low-noise amplifiers (LNAs) 441, one or more switches 442, 443, one or more power amplifiers (PAs) 445, and one or more filters 444 for transmitting and receiving RF signals. In an aspect, components of RF front end 404 can be communicatively coupled with the transceiver 406. Transceiver 406 may be communicatively coupled with one or more modems 408 and processor 403.

In an aspect, each LNA 441 can amplify a received signal at a desired output level. In an aspect, each LNA 441 may have a specified minimum and maximum gain values. In an aspect, the RF front end 404 may use one or more switches 442, 443 to select a particular LNA 441 and the specified gain value based on a desired gain value for a particular application.

Further, for example, one or more PA(s) 445 may be used by the RF front end 404 to amplify a signal for an RF output at a desired output power level. In an aspect, each PA 445 may have a specified minimum and maximum gain values. In an aspect, the RF front end 404 may use one or more switches 443, 446 to select a particular PA 445 and the specified gain value based on a desired gain value for a particular application.

Also, for example, one or more filters 444 can be used by the RF front end 404 to filter a received signal to obtain an input RF signal. Similarly, in an aspect, for example, a respective filter 444 can be used to filter an output from a respective PA 445 to produce an output signal for transmission. In an aspect, each filter 444 can be communicatively coupled with a specific LNA 441 and/or PA 445. In an aspect, RF front end 404 can use one or more switches 442, 443, 446 to select a transmit or receive path using a specified filter 444, LNA 441, and/or PA 445, based on a configuration as specified by transceiver 406 and/or processor 403.

The transceiver 406 may be configured to transmit and receive wireless signals through antenna 402 via the RF front end 404. In an aspect, the transceiver 406 may be tuned to operate at specified frequencies such that the UE 104 can communicate with, for example, the eNB 102. The transceiver 406 may be communicatively coupled with the processor 403 via a bus 410. In an aspect, for example, modem 408 can configure the transceiver 406 to operate at a specified frequency and power level based on the UE configuration of the UE 104 and communication protocol used by the modem 408.

In an aspect, the modem 408 can be a multiband-multimode modem, which can process digital data and communicate with the transceiver 406 such that the digital data is sent and received using the transceiver 406. In an aspect, the modem 408 can be multiband and be configured to support multiple frequency bands for a specific communications protocol. In an aspect, the modem 408 can be multimode and be configured to support multiple operating networks and communications protocols. In an aspect, the modem 408 can control one or more components of the UE 104 (e.g., RF front end 404, transceiver 406) to enable transmission and/or reception of signals from the network based on a specified modem configuration. In an aspect, the modem configuration can be based on the mode of the modem and the frequency band in use. In another aspect, the modem configuration can be based on UE configuration information associated with the UE 104 as provided by the network during cell selection and/or cell reselection.

The UE 104 may further include a memory 405, such as for storing data used herein and/or local versions of applications or resource control component 180 and/or one or more of subcomponents of the resource control component 180 being executed by processor 403. The memory 405 may be coupled to the processor 403 via a bus 410. The memory 405 can include any type of computer-readable medium usable by a computer or processor 403, such as random access memory (RAM), read only memory (ROM), tapes, magnetic discs, optical discs, volatile memory, non-volatile memory, and any combination thereof. In an aspect, for example, memory 405 may be a computer-readable storage medium that stores one or more computer-executable codes defining resource control component 180 and/or one or more of subcomponents of the resource control component 180, and/or data associated therewith, when the UE 104 is operating the processor 403 to execute resource control component 180 and/or one or more of subcomponents of the resource control component 180. In another aspect, for example, the memory 405 may be a non-transitory computer-readable storage medium.

The eNB 102 may include the communicating component 190 having hardware, firmware, and/or software code executable by a processor (e.g. processor(s) 483) for scheduling uplink transmissions from one or more UEs 104, the code comprising instructions and being stored in a memory (e.g., memory 485 or another computer-readable medium). In an aspect, the communicating component 190 may be implemented by one or more processors 483 and memory 485. For example, in an aspect, the one or more processors 483 may correspond to one or more of receive processor 316, transmit processor 316, or controller/processor 375 of eNB 310 (FIG. 3). Moreover, the communicating component 190 may communicate via a transceiver 486 and RF front end 484, which may be similar to the transceiver 406 and RF front end 404 in UE 104, respectively. In an aspect, the communicating component 190 may allocate resources (e.g., Type I ePRACH resources (FIG. 5)) for one or more UEs 104 to use for transmitting uplink physical channels. The communicating component 190 may generate assignments to indicate the allocated uplink resources, and transmit the assignments to the one or more UEs 104. The communicating component 190 may further receive uplink physical channels from one or more UEs 104. The communicating component 190 may include a decoding component 472 for decoding one or more uplink physical channels from one or more UEs 104.

The decoding component 472 may include hardware, firmware, and/or software code executable by a processor for receiving the one or more uplink physical channels, the code comprising instructions and being stored in a memory (e.g., computer-readable medium). For example, the decoding component 472 may include a receive processor and/or a modem. In an aspect, the decoding component 472 may decode a received transmission that is transmitted from the UE 104. For example, in an aspect, the decoding component 472 may receive an uplink physical random access channel (PRACH). The decoding component 472 may estimate a length (e.g., a number of OFDM symbols) of the PRACH and decode the PRACH based on the estimated length of the PRACH.

Figure 5:
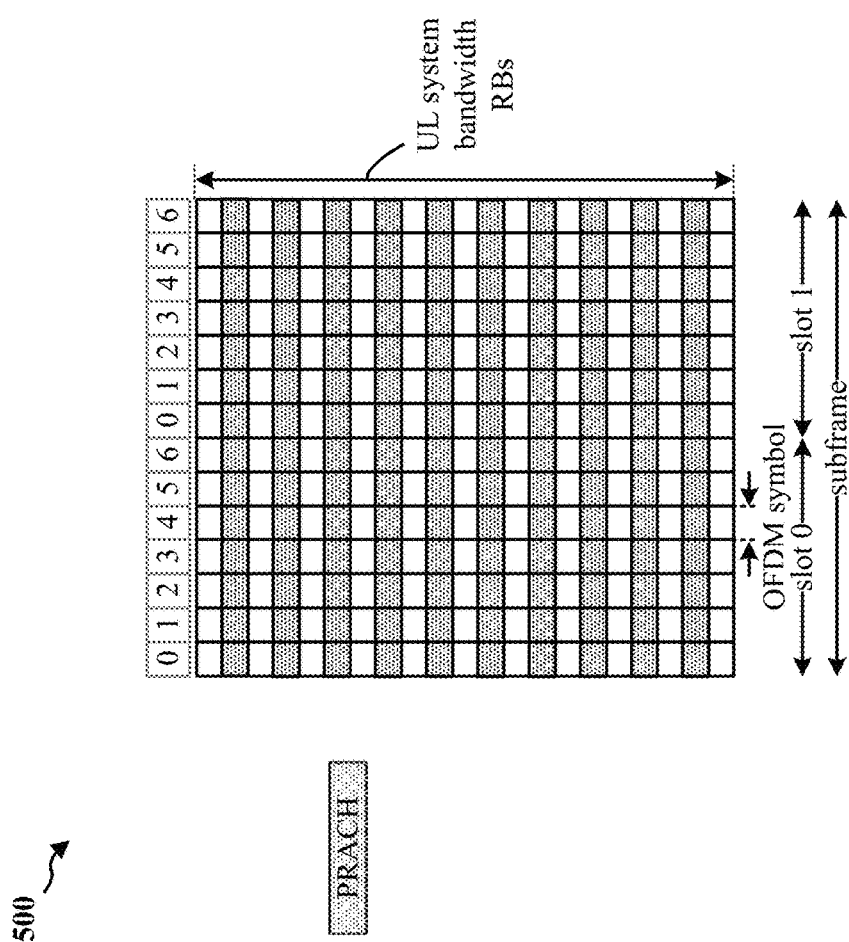
FIG. 5 is a diagram illustrating an example of a frame structure of a Type I enhanced PRACH (ePRACH) resource.

FIG. 5 is a diagram illustrating an example of a frame structure of a Type I ePRACH resource 500 applicable to frequency division duplex (FDD). The communicating component 190 may schedule uplink resources to each UE 104 as shown in FIG. 5. For example, the communicating component 190 may schedule a UE 104 to transmit on one or more frequency bands (e.g., 10 sub-bands) of the uplink system bandwidth across a duration (e.g., slot 0 and slot 1) of one or more subframes in a frame. In an aspect, each UE 104 may transmit a first type of data and/or a second type of data to eNB 102 according to a scheduled Type I ePRACH resource such that multiple UEs 104 may contend for access to a communication channel in the frequency domain.

Figure 6:
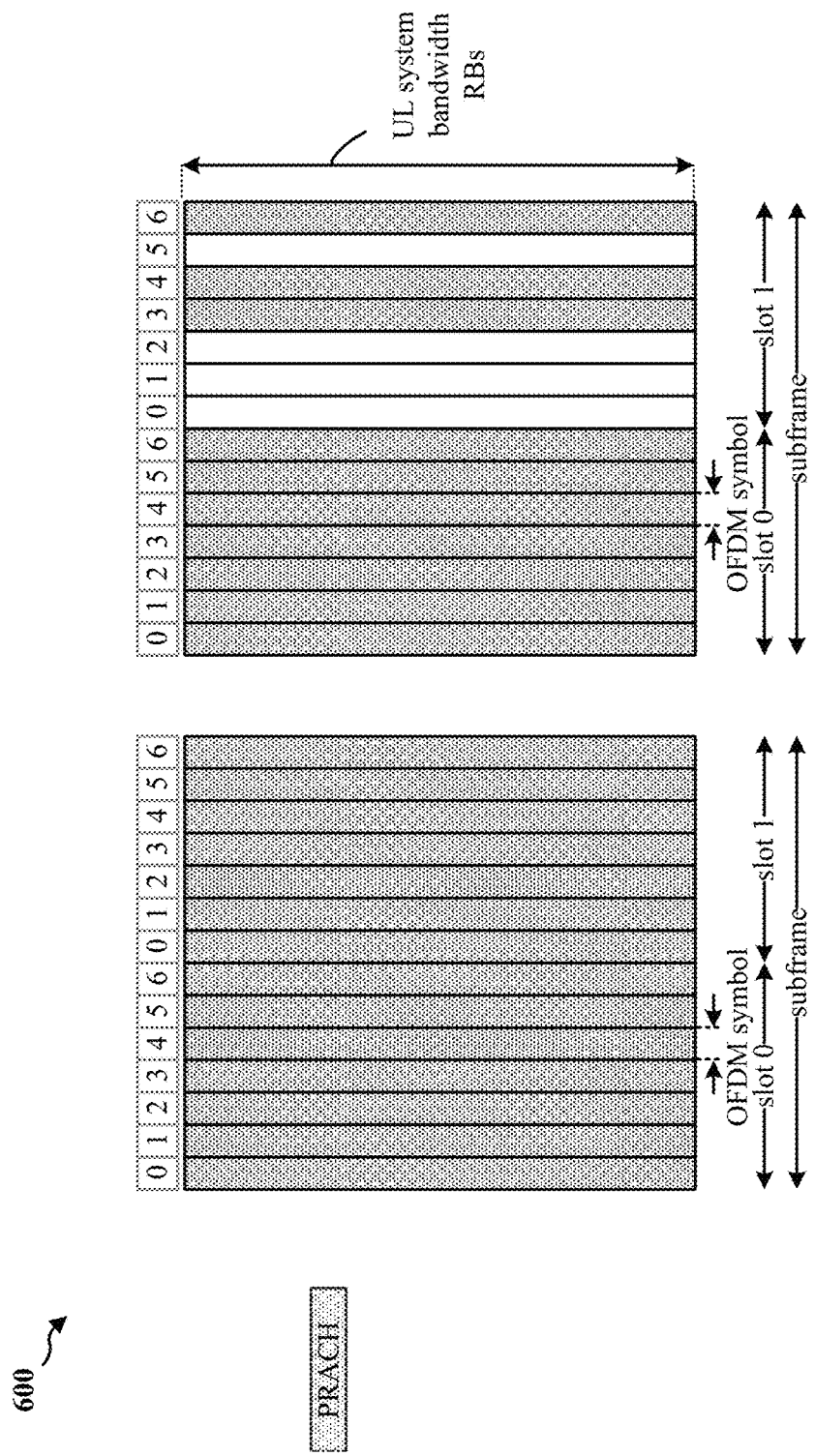
FIG. 6 is a diagram illustrating an example of a frame structure of a Type II ePRACH resource.

FIG. 6 is a diagram illustrating an example of a frame structure of a Type II ePRACH resource 600 applicable to time division duplex (TDD). The transmitting component 426 of each UE 104 may schedule uplink resources as shown in FIG. 6. For example, the transmitting component 426 may schedule uplink transmissions across the entire uplink system bandwidth at varying times. For example, the transmitting component 426 may schedule uplink transmissions for a duration of a subframe (e.g., 14 OFDM symbols), a duration of slot of a subframe (e.g., 7 OFDM symbols), a duration of two OFDM symbols, and/or a duration of a one OFDM symbol. In an aspect, the transmitting component 426 may schedule a duration of the uplink transmissions based on a location of the UE 104 in a cell of the eNB 102. In an aspect, each UE 104 may transmit a second type of data to the eNB 102 according the scheduled Type II ePRACH resource such that multiple UEs 104 may contend for access to a communication channel in the time domain.

The illustrated Type I ePRACH and Type II ePRACH frame structures are merely examples, and various modifications may be made to the number of subframes, the number of slots included in a subframe, or the number of symbols included in the slot.

Figure 7:
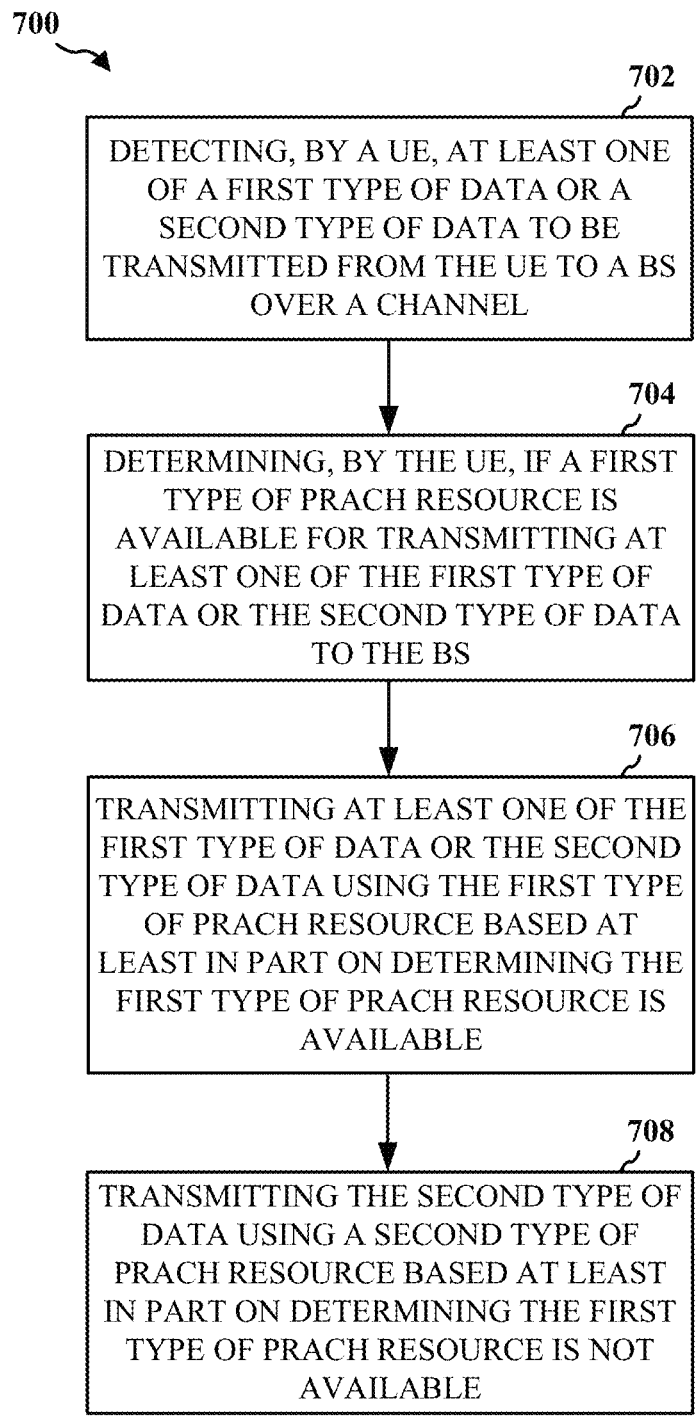
FIG. 7 is a flowchart of a method of wireless communication for a UE.

FIG. 7 is a flow diagram illustrating an example method 700 of wireless communication at a user equipment. The method 700 may be performed by a UE 104.

At block 702, the method 700 may include detecting at least one of a first type of data or a second type of data to be transmitted from the UE 104 over a channel. In an aspect, for example, the detecting component 422 may detect at least one of the first type of data or the second type of data to be transmitted to the eNB 102 over an unlicensed channel of communications link 120. For example, the detecting component 422 (e.g., in conjunction with memory 405 and/or modem 408) may detect one or more messages of a set of messages to transmit to the eNB 102. In an aspect, the set of messages may include a Non-Access Stratum (NAS) level message such as, but not limited to, an Access Request or a Track Area Update, a Radio Resource Control (RRC) level message such as, but not limited to, an RRC Connection Request, an RRC Reestablishment Request, an RRC Re-establishment Complete, or an RRC Reconfiguration Complete, or a Medium Access Control (MAC) level message such as, but not limited to, a Buffer Status Report triggered by new data arrival or a Buffer Status Report triggered by a periodic timer. In an aspect, the first type of data may include each message of the set messages and the second type of data may include a subset of the set of messages. For example, in an aspect, the second type of data may include the Non-Access Stratum (NAS) level messages, the RRC level messages, and a subset of the MAC level messages. Specifically, in an aspect, the second type of messages may include a Buffer Status Report triggered by a timer, but may not include a Buffer Status Report triggered by arrival of new data. In an aspect, upon detecting at least one of the first type of data or the second type of data to transmit to the eNB 102, the detecting component 422 may verify that at least one of the detected first type of data or the second type of data should be transmitted to eNB 102. For example, in an aspect, the detecting component 422 may determine that the UE 104 has already transmitted the detected first type of data or the second type of data to eNB 102. In this case, the detecting component 422 may determine that at least one of the detected first type of data or the second type of data should not be transmitted to eNB 102, and the detecting component 422 may wait to detect another first type of data or second type of data. Otherwise, if the detecting component 422 determines the UE 104 has not yet transmitted at least one of the detected first type of data or the second type of data to eNB 102, then the detecting component 422 may verify that at least one of the detected first type of data or second type of data should be transmitted to the eNB 102.

At block 704, the method 700 may include determining if a first type of PRACH resource is available for transmitting at least one of a first type of data or a second type of data to a base station. In an aspect, for example, the resource availability determining component 424 may determine if a Type I ePRACH resource 500 is available for transmitting at least one of a first type of data or a second type of data to the eNB 102. The resource availability determining component 424 may determine if the Type I ePRACH resource is available in response to the detecting component 422 verifying that at least one of the first type of data or the second type should be transmitted to the eNB 102. In an aspect, the resource availability determining component 424 may determine (e.g., in conjunction with memory 405 and/or one or more processors 403) whether or not the UE 104 received an uplink resource assignment (e.g., an allocation of Type I ePRACH resource 500) from the eNB 102. If the resource availability determining component 424 determines that the uplink resource assignment has been received from the eNB 102, then the resource availability determining component 424 may determine that the Type I ePRACH resource is available for transmitting at least one of the first type of data or the second type of data to the eNB 102. If the resource availability determining component 424 determines that the uplink resource assignment has not been received from the eNB 102, then the resource availability determining component 424 may determine that the Type I ePRACH resource is not available for transmitting at least one of the first type of data or the second type of data. The eNB 102 may transmit an uplink resource assignment to a UE 104 when the eNB 102 accesses the communications link 120. For example, the eNB 102 may transmit the uplink resource assignment to the UE 104 when the eNB 102 has downlink traffic to transmit and the eNB 102 is aware of uplink transmissions from the UE 104. Otherwise, the eNB 102 may not transmit the uplink resource assignment to the UE 104.

At block 706, the method 700 may include transmitting at least one of a first type of data or a second type of data based at least in part on determining a first type of PRACH resource is available. In an aspect, for example, the transmitting component 426 may transmit at least one of the first type of data or the second type of data to the eNB 102 based at least in part on the resource availability determining component 424 determining the Type I ePRACH resource 500 is available. In an aspect, if the resource availability determining component 424 determines the Type I ePRACH resource 500 is available, then the transmitting component 426 may perform a clear channel assessment (CCA) procedure to contend for access to the Type I ePRACH resource. The transmitting component 426 may determine a CCA status that indicates whether the contention has been won. If the transmitting component 426 determines a successful CCA status for the Type I ePRACH resource (e.g., UE 104 has won the contention), then the transmitting component 426 may transmit at least one of the first type of data or the second type of data using the Type I ePRACH resource 500. If the transmitting component 426 determines a failed CCA status (e.g., UE 104 has failed to win the contention), then the detecting component 422 may repeat the step of verifying whether or not the first type of data or the second type of data should be transmitted to the eNB 102.

At block 708, the method 700 may include transmitting a second type of data using a second type of PRACH resource based at least in part on determining a first type of PRACH resource is not available. In an aspect, for example, the transmitting component 426 may transmit the second type of data using a Type II ePRACH resource 600 based at least in part on the resource availability determining component 424 determining the Type I ePRACH resource 500 is not available.

In an aspect, the transmitting component 426 may schedule the Type II ePRACH resource 600. For example, the transmitting component 426 may select a duration of the Type II ePRACH transmission based on a location of UE 104 in a cell of eNB 102 (e.g., based on Reference Signal Received Power (RSRP) using Dedicated Reference Signaling (DRS) measurements)). For example, if the UE 104 is located in a center of the cell, then the transmitting component 426 may select a shorter duration may be selected. If the UE 104 is located at an edge of the cell, then the transmitting component 426 may select a longer duration. The multiple Type II ePRACH sizes may be defined such as, but not limited to, 1, 2, 7, and 14 OFDM symbols.

In an aspect, if the resource availability determining component 424 determines the Type I ePRACH resource 500 is not available, then the transmitting component 426 may perform a clear channel assessment (CCA) procedure and/or an enhanced CCA procedure (eCCA) to contend for access to the Type II ePRACH resource 600. The transmitting component 426 may determine a CCA status and/or an eCCA status that indicates whether the contention has been won. If the transmitting component 426 determines a successful CCA status and/or a successful eCCA status for the Type II ePRACH resource 600 (e.g., UE 104 has won the contention), then the transmitting component 426 may transmit the second type of data using the Type II ePRACH resource 600. If the transmitting component 426 determines a failed CCA status and/or a failed eCCA status (e.g., UE 104 has failed to win the contention), then the detecting component 422 may repeat the step of verifying whether or not the first type of data or the second type of data should be transmitted to the eNB 102.

In an aspect, the transmitting component 426 may implement timers to restrict a frequency of Type II ePRACH transmissions at each UE 104 in order to limit congestion on a communications channel. For example, the transmitting component 426 may limit a number of Type II ePRACH transmission attempts allowed by a UE 104 in a given time period. Alternatively, or additionally, the transmitting component 426 may limit the number of Type II ePRACH transmission attempts allowed by a UE 104 using a timer (e.g., allow Type II ePRACH transmissions once every 10 ms).

Moreover, in an aspect, if the detecting component 422 determines a Type I ePRACH resource 500 is available (e.g., UE 104 receives an uplink assignment from eNB 102) after transmitting the second type of data using the Type II ePRACH resource 600, then the transmitting component 426 may retransmit the second type of data using the Type I ePRACH resource without waiting for a random access response to the Type II ePRACH transmission from the eNB 102.

The transmitting component 426 may not transmit the first type of data using the Type II ePRACH resource 600. Accordingly, in an alternative or additional aspect, if the resource availability determining component 424 determines that the Type I ePRACH resource 500 is not available, then the detecting component 422 may repeat the step of verifying whether or not the first type of data or the second type of data should be transmitted to eNB 102.

Figure 8:
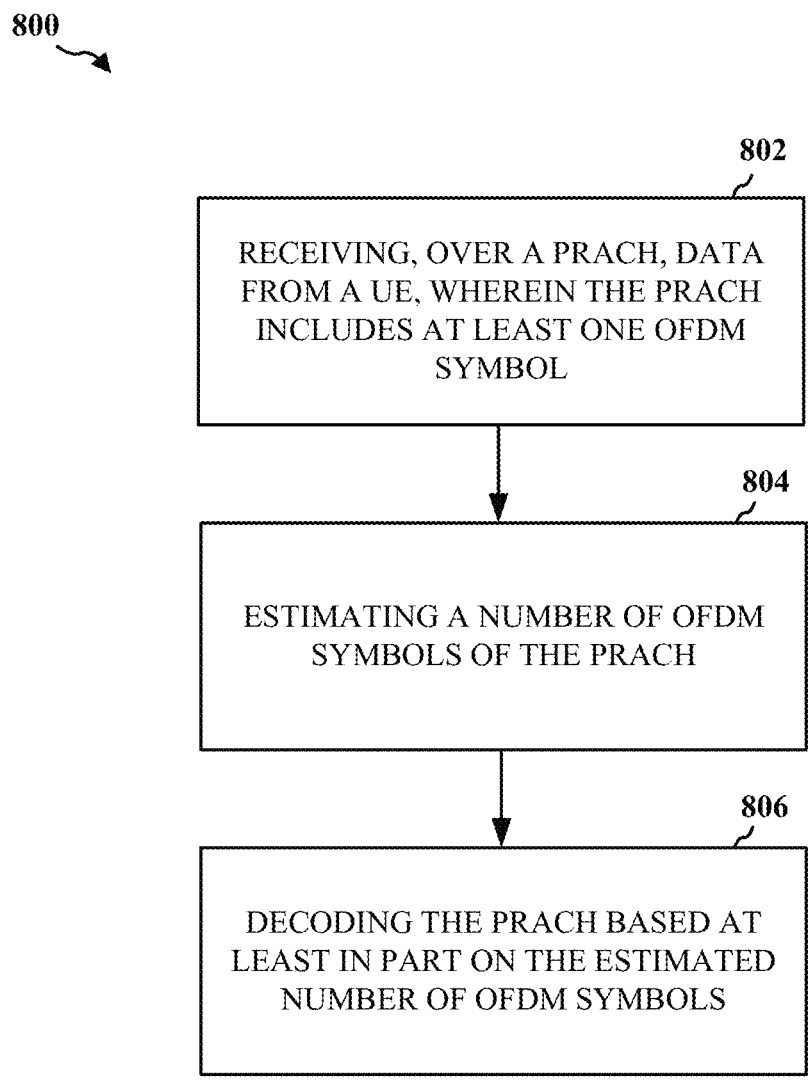
FIG. 8 is a flowchart of a method of wireless communication for an eNB.

FIG. 8 is a flow diagram illustrating an example method 800 of wireless communication at a base station. The method 800 may be performed by an eNB 102.

At block 802, the method 800 may include receiving, over a PRACH, data from a UE, where the PRACH includes at least one OFDM symbol. In an aspect, for example, the decoding component 472 may receive the first type of data or the second type of data transmitted from the UE 104 using the corresponding Type I ePRACH resource 500 or the Type II ePRACH resource 600. The length of a Type II ePRACH resource 600 received from a UE 104 may vary based on, for example, a location of the UE 104 in a cell of the eNB 102.

At block 804, the method 800 may include estimating a number of OFDM symbols of the PRACH. In an aspect, for example, the decoding component 472 may estimate the number of OFDM symbols of the received PRACH. In an aspect, the decoding component 472 may estimate the number of OFDM symbols of the PRACH based on an estimated location of the UE 104 in a cell of the eNB 102.

At block 806, the method 800 may include decoding a PRACH based at least in part on an estimated number of OFDM symbols. In an aspect, for example, the decoding component 472 may decode the PRACH based at least in part on the estimated number of OFDM symbols. For example, the decoding component 472 may decode all possible lengths of a received PRACH as frequently as every OFDM symbol or every several OFDM symbols.

Figure 9:
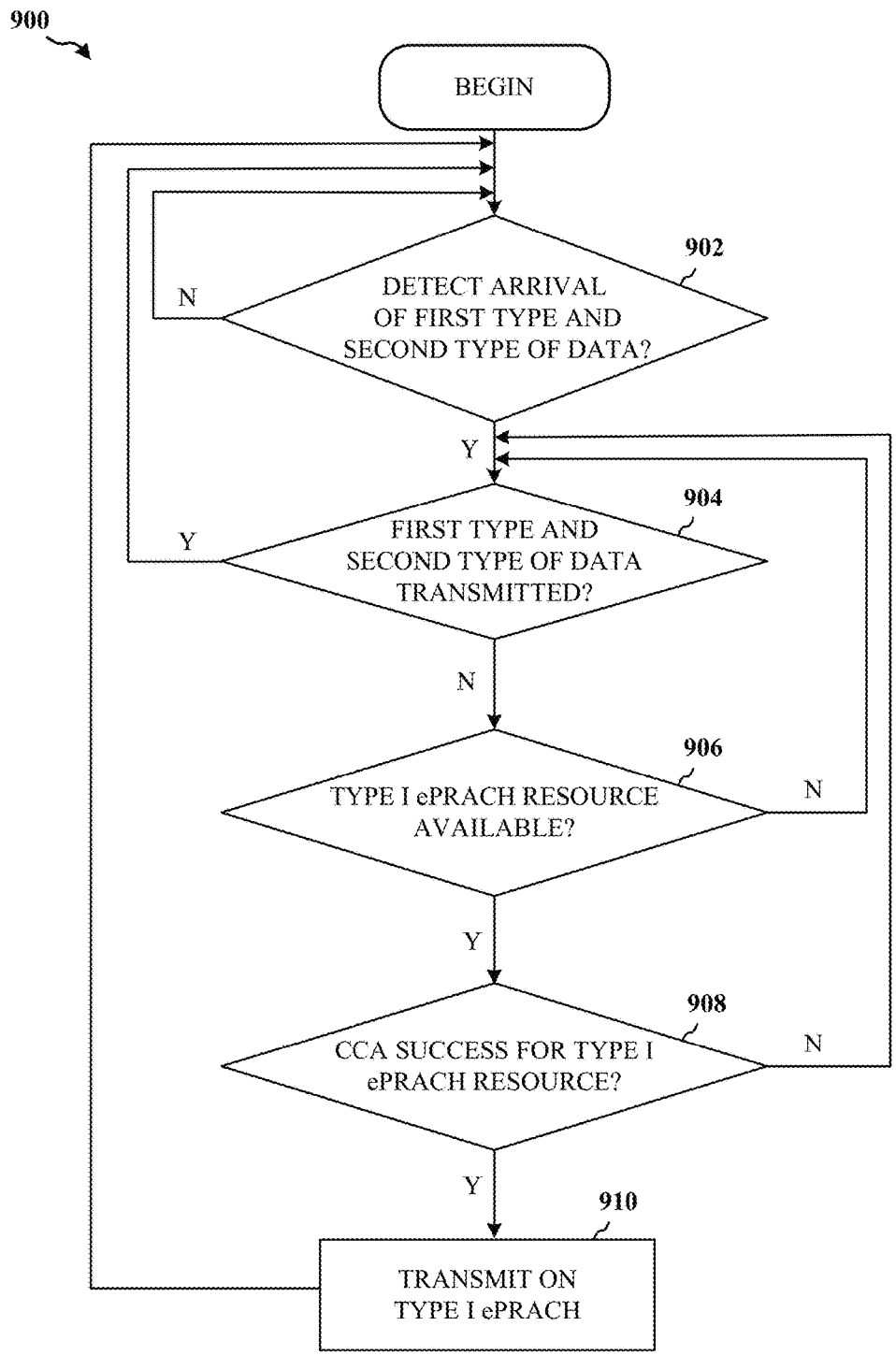
FIG. 9 is a flowchart of a method of performing contention-based random access to transmit a first type of data and/or a second type of data over a Type I ePRACH resource.

FIG. 9 is a flow diagram illustrating an example method 900 of wireless communication at a UE when there is a first type of data and a second type of data to be transmitted from the UE. The method 900 may performed by a UE 104.

At block 902, the method 900 may include detecting the arrival of a first type of data and a second type of data to be transmitted from the UE 104 over a channel. In an aspect, for example, the detecting component 422 may detect the first type of data and the second type of data to be transmitted to the eNB 102 over an unlicensed channel of communications link 120. For example, the detecting component 422 (e.g., in conjunction with memory 405 and/or modem 408) may detect a set messages to transmit to the eNB 102. In an aspect, the set of messages may include a Non-Access Stratum (NAS) level message such as, but not limited to, an Access Request or a Track Area Update, a Radio Resource Control (RRC) level message such as, but not limited to, an RRC Connection Request, an RRC Reestablishment Request, an RRC Re-establishment establishment Complete, or an RRC Reconfiguration Complete, or a Medium Access Control (MAC) level message such as, but not limited to, a Buffer Status Report triggered by new data arrival or a Buffer Status Report triggered by a periodic timer. In an aspect, the first type of data may include each message of the set messages and the second type of data may include a subset of the set of messages. For example, in an aspect, the second type of data may include the Non-Access Stratum (NAS) level messages, the RRC level messages, and a subset of the MAC level messages. Specifically, in an aspect, the second type of messages may include a Buffer Status Report triggered by a timer, but may not include a Buffer Status Report triggered by arrival of new data.

At block 904, the method 900 may include verifying that the detected first type of data and the detected second type of data should be transmitted to the eNB 102. In an aspect, for example, the detecting component 422 may verify that the detected first type of data and the detected second type of data should be transmitted to eNB 102. For example, in an aspect, the detecting component 422 may determine that the UE 104 has already transmitted the detected first type of data and the second type of data to the eNB 102. If the first type of data and the second type of data have already been transmitted to the eNB 102, then the method may proceed to block 902. Otherwise, if the detecting component 422 determines the UE 104 has not yet transmitted the detected first type of data and the second type of data to eNB 102, then the detecting component 422 may verify that the detected first type of data and second type of data should be transmitted to the eNB 102 using the Type I ePRACH resource.

At block 906, the method 900 may determine if a first type of PRACH resource is available to transmit the first type of data and the second type of data. In an aspect, for example, the resource availability determining component 424 may determine whether the Type I ePRACH resource 500 is available for transmitting the first type of data and the second type of data to the eNB 102. The resource availability determining component 424 may determine if the Type I ePRACH resource is available in response to the detecting component 422 verifying that the first type of data and the second type of data should be transmitted to the eNB 102. In an aspect, the resource availability determining component 424 may determine (e.g., in conjunction with memory 405 and/or one or more processors 403) whether or not the UE 104 received an uplink resource assignment (e.g., an allocation of Type I ePRACH resource 500) from the eNB 102. If the resource availability determining component 424 determines that the uplink resource assignment has been received from the eNB 102, then the resource availability determining component 424 may determine that the Type I ePRACH resource 500 is available for transmitting the first type of data and the second type of data to the eNB 102. If the resource availability determining component 424 determines that the uplink resource assignment has not been received from the eNB 102, then the resource availability determining component 424 may determine that the Type I ePRACH resource 500 is not available for transmitting the first type of data and the second type of data. The eNB 102 may transmit an uplink resource assignment to the UE 104 when the eNB 102 accesses the communication link 120. For example, the eNB 102 may transmit the uplink resource assignment to the UE 104 when the eNB has downlink traffic to transmit and the eNB 102 is aware of uplink transmissions from the UE 104. If the Type 1 ePRACH resource 500 is available, the method 900 may proceed to 908. Otherwise, if the resource availability determining component 424 determines the Type I ePRACH resource 500 is not available, then the method 900 may proceed to block 904.

At block 908, the method 900 may perform clear channel assessment (CCA) procedure to contend for access to the Type I ePRACH resource. In an aspect, for example, the transmitting component 426 may determine a CCA status that indicates whether the contention has been won. If the transmitting component 426 determines a successful CCA status for the Type I ePRACH resource (e.g., UE 104 has won the contention), then method 900 may proceed to block 910. Otherwise, if the transmitting component 426 determines a failed CCA status and/or a failed CCA status (e.g., UE 104 has failed to win the contention), then the method 900 may proceed to block 904.

At block 910, the method 900 may transmit the first type of data and the second type of data on the Type 1 ePRACH resource. In an aspect, for example, the transmitting component 426 may transmit the first type of data and the second type of data using a Type 1 ePRACH resource 500 based at least in part on the resource availability determining component 424 determining the Type I ePRACH resource 500 is available. For example, the transmitting component 426 may select a duration of the Type I ePRACH transmission based on a location of UE 104 in a cell of eNB 102 (e.g., based on Reference Signal Received Power (RSRP) using Dedicated Reference Signaling (DRS) measurements)). For example, if the UE 104 is located in a center of the cell, then the transmitting component 426 may select a shorter duration may be selected. If the UE 104 is located at an edge of the cell, then the transmitting component 426 may select a longer duration. After transmitting the first type of data and the second type of data on the Type 1 ePRACH resource, the method 900 may proceed to block 902.

Figure 10:
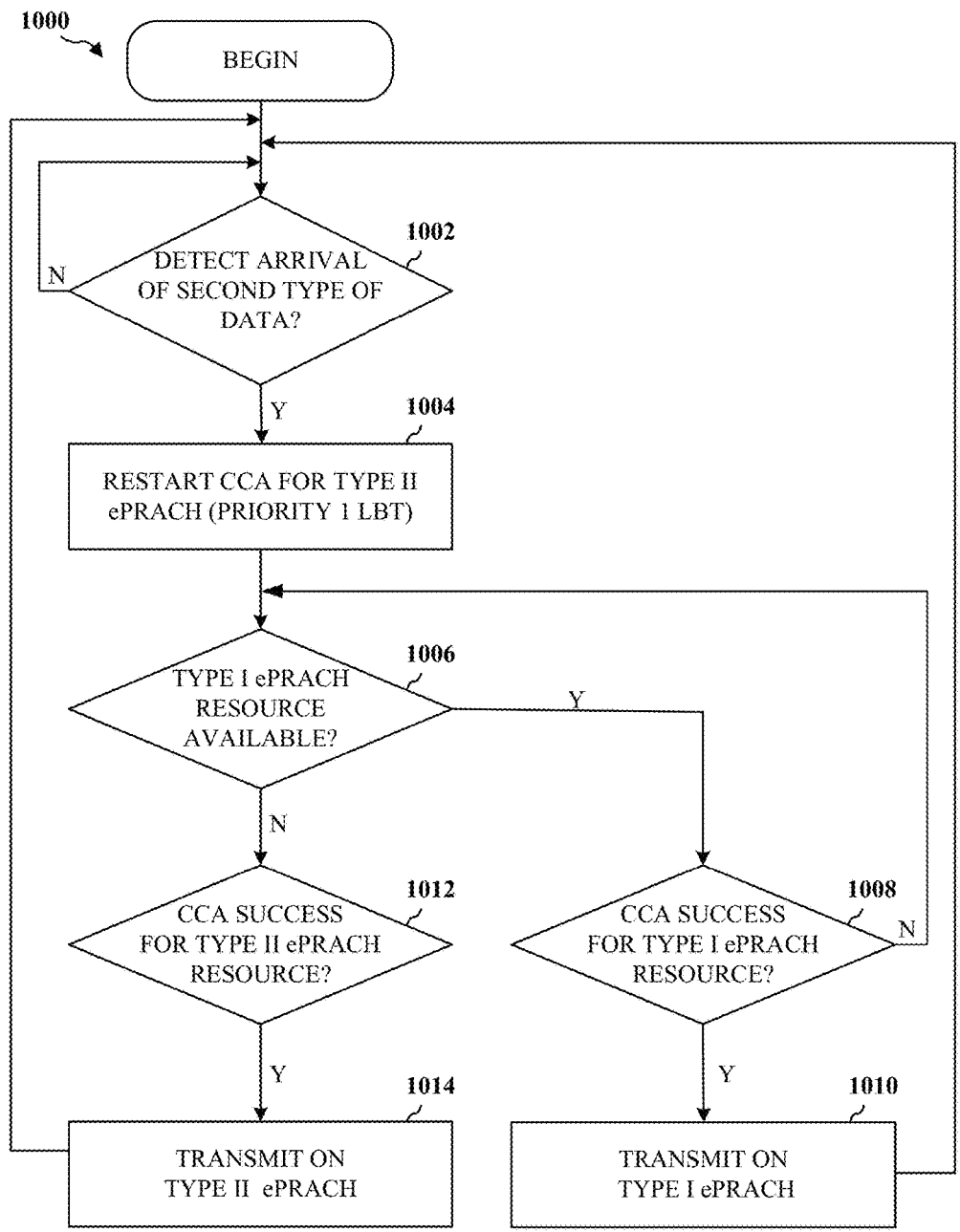
FIG. 10 is a flowchart of a method of performing contention-based random access to transmit a second type of data over a Type I ePRACH and/or a Type II ePRACH resource.

FIG. 10 is a flow diagram illustrating an example method 1000 of wireless communication at a UE when there is a second type of data to be transmitted from the UE. The method 1000 may performed by a UE 104.

At block 1002, the method 1000 may include detecting the arrival of a second type of data to be transmitted from the UE 104 over a channel. In an aspect, for example, the detecting component 422 may detect the second type of data to be transmitted to the eNB 102 over an unlicensed channel of communications link 120. For example, the detecting component 422 (e.g., in conjunction with memory 405 and/or modem 408) may detect a set messages to transmit to the eNB 102. In an aspect, the set of messages may include a Non-Access Stratum (NAS) level message such as, but not limited to, an Access Request or a Track Area Update, a Radio Resource Control (RRC) level message such as, but not limited to, an RRC Connection Request, an RRC Reestablishment Request, an RRC Re-establishment Complete, or an RRC Reconfiguration Complete, or a Medium Access Control (MAC) level message such as, but not limited to, a Buffer Status Report triggered by new data arrival or a Buffer Status Report triggered by a periodic timer. In an aspect, the second type of messages may include a Buffer Status Report triggered by a timer, but may not include a Buffer Status Report triggered by arrival of new data.

At block 1004, the method 1000 may include restarting a clear channel assessment (CCA) procedure to contend for access to the Type II ePRACH resource. In an aspect, for example, the resource availability determining component 424 may restart the CCA procedure to determine if a Type II ePRACH resource 600 is available for transmitting the second type of data to the eNB 102. In an aspect, the resource availability determining component may use a listen-before-talk (LBT) mechanism (e.g., priority 1 LBT) to determine if the Type II ePRACH resource 600 is available.

At block 1006, the method 1000 may determine if a first type of PRACH resource is available to transmit the second type of data. In an aspect, for example, the resource availability determining component 424 may determine whether the Type I ePRACH resource 500 is available for transmitting the second type of data to the eNB 102. The resource availability determining component 424 may determine if the Type I ePRACH resource is available in response to the detecting component 422 verifying that the second type of data should be transmitted to the eNB 102. In an aspect, the resource availability determining component 424 may determine (e.g., in conjunction with memory 405 and/or one or more processors 403) whether or not the UE 104 received an uplink resource assignment (e.g., an allocation of Type I ePRACH resource 500) from the eNB 102. If the resource availability determining component 424 determines that the uplink resource assignment has been received from the eNB 102, then the resource availability determining component 424 may determine that the Type I ePRACH resource 500 is available for transmitting the second type of data to the eNB 102. If the resource availability determining component 424 determines that the uplink resource assignment has not been received from the eNB 102, then the resource availability determining component 424 may determine that the Type I ePRACH resource 500 is not available for transmitting the second type of data. The eNB 102 may transmit an uplink resource assignment to the UE 104 when the eNB 102 accesses the communication link 120. For example, the eNB 102 may transmit the uplink resource assignment to the UE 104 when the eNB has downlink traffic to transmit and the eNB 102 is aware of uplink transmissions from the UE 104. In an aspect, if the resource availability determining component 424 determines the Type I ePRACH resource 500 is available, the method 1000 may proceed to 1008. Otherwise, if the resource availability determining component 424 determines the Type I ePRACH resource 500 is not available, then the method 1000 may proceed to block 1012.

At block 1008, the method 1000 may perform clear channel assessment (CCA) procedure to contend for access to the Type I ePRACH resource. In an aspect, for example, the transmitting component 426 may determine a CCA status that indicates whether the contention has been won. If the transmitting component 426 determines a successful CCA status for the Type I ePRACH resource (e.g., UE 104 has won the contention), then method 1000 may proceed to block 1010. Otherwise, if the transmitting component 426 determines a failed CCA status and/or a failed eCCA status (e.g., UE 104 has failed to win the contention), then the method 1000 may proceed to block 1006.

At block 1010, the method 1000 may transmit the second type of data on the Type 1 ePRACH resource. In an aspect, for example, the transmitting component 426 may transmit the second type of data using a Type 1 ePRACH resource 500 based at least in part on the resource availability determining component 424 determining the Type I ePRACH resource 500 is available. For example, the transmitting component 426 may select a duration of the Type I ePRACH transmission based on a location of UE 104 in a cell of eNB 102 (e.g., based on Reference Signal Received Power (RSRP) using Dedicated Reference Signaling (DRS) measurements)). For example, if the UE 104 is located in a center of the cell, then the transmitting component 426 may select a shorter duration may be selected. If the UE 104 is located at an edge of the cell, then the transmitting component 426 may select a longer duration. After transmitting the first type of data and the second type of data on the Type 1 ePRACH resource, the method 1000 may proceed to block 1002.

At block 1012, the method 1000 may perform a clear channel assessment (CCA) procedure to contend for access to the Type II ePRACH resource. In an aspect, for example, the transmitting component 426 may determine a CCA status that indicates whether the contention has been won. If the transmitting component 426 determines a successful CCA status for the Type II ePRACH resource (e.g., UE 104 has won the contention), then method 1000 may proceed to block 1014. Otherwise, if the transmitting component 426 determines a failed CCA status and/or a failed eCCA status (e.g., UE 104 has failed to win the contention), then the method 1000 may proceed to block 1006.

At block 1014, the method 1000 may transmit the second type of data on the Type II ePRACH resource. In an aspect, for example, the transmitting component 426 may transmit the second type of data using a Type II ePRACH resource 600 based at least in part on the resource availability determining component 424 determining the Type II ePRACH resource 600 is available. For example, the transmitting component 426 may select a duration of the Type II ePRACH transmission based on a location of UE 104 in a cell of eNB 102 (e.g., based on Reference Signal Received Power (RSRP) using Dedicated Reference Signaling (DRS) measurements)). For example, if the UE 104 is located in a center of the cell, then the transmitting component 426 may select a shorter duration may be selected. If the UE 104 is located at an edge of the cell, then the transmitting component 426 may select a longer duration. After transmitting the second type of data on the Type II ePRACH resource 600, the method 1000 may proceed to block 1002.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
    detecting, by a user equipment (UE), at least one of a first type of data or a second type of data to be transmitted from the UE to a base station (BS) over a channel;
    determining, by the UE, if a first type of physical random access channel (PRACH) resource is available for transmitting at least one of the first type of data or the second type of data to the BS;
    transmitting at least one of the first type of data or the second type of data using the first type of PRACH resource based at least in part on determining the first type of PRACH resource is available; and
    transmitting the second type of data using a second type of PRACH resource based at least in part on determining the first type of PRACH resource is not available.

2. The method of claim 1, wherein:
    the first type of PRACH resource is available when the BS accesses the channel; and
    the second type of PRACH resource is available when the BS does not access the channel.

3. The method of claim 1, wherein:
    the first type of data includes a plurality of buffer status reports; and
    the second type of data includes a subset of the plurality of the buffer status reports.

4. The method of claim 1, further comprising transmitting the second type of data using the first type of PRACH resource if the UE determines the first type of PRACH resource is available after transmitting the second type of data using the second type of PRACH resource.

5. The method of claim 1, wherein:
    the second type of PRACH resource includes a variable number of orthogonal frequency division multiplexing (OFDM) symbols.

6. The method of claim 1, further comprising:
    determining at least one of a clear channel assessment (CCA) status for the first type of PRACH resource in response to determining the first type of PRACH resource is available; and
    wherein the transmitting the first type of data or the second type of data using the first type of PRACH resource is performed in response to determining at least one of a successful CCA status for the first type of PRACH resource.

7. The method of claim 1, further comprising:
    determining at least one of a clear channel assessment (CCA) status or an extended CCA (eCCA) status for the second type of PRACH resource in response to determining the first type of PRACH resource is not available; and
    wherein the transmitting the second type of data using the second type of PRACH resource is performed in response to determining at least one of a successful CCA status or a successful eCCA status for the second type of PRACH resource.

8. The method of claim 1, further comprising:
    verifying at least one of the first type of data or the second type of data is to be transmitted in response to determining the first type of PRACH resource is not available; and
    repeating the determining until the verifying indicates the first type of data or the second type of data is not to be transmitted.

9. The method of claim 1, wherein transmitting the second type of data using the second type of PRACH resource further comprises:
    selecting a duration for the transmitting the second type of data based on a location of the UE in a cell of the BS.

10. The method of claim 1, wherein transmitting the second type of data using the second type of PRACH resource further comprises:
    determining a time for the transmitting the second type of data based on a timer or a number of transmission attempts in a time period.

11. An apparatus for wireless communication, comprising:
    a transceiver;
    a memory configured to store instructions; and
    one or more processors communicatively coupled to the transceiver and the memory, the one or more processors configured to execute the instructions to:
        detect at least one of a first type of data or a second type of data to be transmitted to a base station (BS) over a channel;
        determine if a first type of physical random access channel (PRACH) resource is available for transmitting at least one of the first type of data or the second type of data to the BS;
        transmit at least one of the first type of data or the second type of data using the first type of PRACH resource based at least in part on determining the first type of PRACH resource is available; and
        transmit the second type of data using a second type of PRACH resource based at least in part on determining the first type of PRACH resource is not available.

12. The apparatus of claim 11, wherein:
    the first type of PRACH resource is available when the BS accesses the channel; and
    the second type of PRACH resource is available when the BS does not access the channel.

13. The apparatus of claim 11, wherein:
    the first type of data includes a plurality of buffer status reports; and
    the second type of data includes a subset of the plurality of the buffer status reports.

14. The apparatus of claim 11, wherein the one or more processors are further configured to transmit the second type of data using the first type of PRACH resource if the UE determines the first type of PRACH resource is available after transmitting the second type of data using the second type of PRACH resource.

15. The apparatus of claim 11, wherein:
    the second type of PRACH resource includes a variable number of orthogonal frequency division multiplexing (OFDM) symbols.

16. The apparatus of claim 11, wherein the one or more processors are further configured to:
    determine at least one of a clear channel assessment (CCA) status for the first type of PRACH resource in response to determining the first type of PRACH resource is available; and wherein the transmitting the first type of data or the second type of data using the first type of PRACH resource is performed in response to determining at least one of a successful CCA status for the first type of PRACH resource.

17. The apparatus of claim 11, wherein the one or more processors are further configured to:
  determine at least one of a clear channel assessment (CCA) status or an extended CCA (eCCA) status for the second type of PRACH resource in response to determining the first type of PRACH resource is not available; and
  wherein the transmitting the second type of data using the second type of PRACH resource is performed in response to determining at least one of a successful CCA status or a successful eCCA status for the second type of PRACH resource.

18. The apparatus of claim 11, wherein the one or more processors are further configured to:
  verify at least one of the first type of data or the second type of data is to be transmitted in response to determining the first type of PRACH resource is not available; and
  repeat the determining until the verifying indicates the first type of data or the second type of data is not to be transmitted.

19. The apparatus of claim 11, wherein transmitting the second type of data using the second type of PRACH resource further comprises:
  selecting a duration for the transmitting the second type of data based on a location of the UE in a cell of the BS.

20. The apparatus of claim 11, wherein transmitting the second type of data using the second type of PRACH resource further comprises:
  determining a time for the transmitting the second type of data based on a timer or a number of transmission attempts in a time period.

21. An apparatus for wireless communication, comprising:
  means for detecting at least one of a first type of data or a second type of data to be transmitted to a base station (BS) over a channel;
  means for determining if a first type of physical random access channel (PRACH) resource is available for transmitting at least one of the first type of data or the second type of data to the BS;
  means for transmitting at least one of the first type of data or the second type of data using the first type of PRACH resource based at least in part on determining the first type of PRACH resource is available; and
  means for transmitting the second type of data using a second type of PRACH resource based at least in part on determining the first type of PRACH resource is not available.

22. A non-transitory computer-readable medium storing computer executable code, comprising:
  code that when executed by a computer causes the computer to:
    detect at least one of a first type of data or a second type of data to be transmitted to a base station (BS) over a channel;
    determine if a first type of physical random access channel (PRACH) resource is available for transmitting at least one of the first type of data or the second type of data to the BS;
    transmit at least one of the first type of data or the second type of data using the first type of PRACH resource based at least in part on determining the first type of PRACH resource is available; and
    transmit the second type of data using a second type of PRACH resource based at least in part on determining the first type of PRACH resource is not available.

23. The non-transitory computer-readable medium of claim 22, wherein:
  the first type of PRACH resource is available when the BS accesses the channel; and
  the second type of PRACH resource is available when the BS does not access the channel.

24. The non-transitory computer-readable medium of claim 22, wherein:
  the first type of data includes a plurality of buffer status reports; and
  the second type of data includes a subset of the plurality of the buffer status reports.

25. The non-transitory computer-readable medium of claim 22, further comprising code that when executed by a computer causes the computer to:
  transmit the second type of data using the first type of PRACH resource if the UE determines the first type of PRACH resource is available after transmitting the second type of data using the second type of PRACH resource.

26. The non-transitory computer-readable medium of claim 22, wherein:
  the second type of PRACH resource includes a variable number of orthogonal frequency division multiplexing (OFDM) symbols.

27. The non-transitory computer-readable medium of claim 22, further comprising code that when executed by a computer causes the computer to:
  determine at least one of a clear channel assessment (CCA) status for the first type of PRACH resource in response to determining the first type of PRACH resource is available; and
  wherein the transmitting the first type of data or the second type of data using the first type of PRACH resource is performed in response to determining at least one of a successful CCA status for the first type of PRACH resource.

28. The non-transitory computer-readable medium of claim 22, further comprising code that when executed by a computer causes the computer to:
  determine at least one of a clear channel assessment (CCA) status or an extended CCA (eCCA) status for the second type of PRACH resource in response to determining the first type of PRACH resource is not available; and
  wherein the transmitting the second type of data using the second type of PRACH resource is performed in response to determining at least one of a successful CCA status or a successful eCCA status for the second type of PRACH resource.

29. The non-transitory computer-readable medium of claim 22, further comprising code that when executed by a computer causes the computer to:
  verify at least one of the first type of data or the second type of data is to be transmitted in response to determining the first type of PRACH resource is not available; and
  repeat the determining until the verifying indicates the first type of data or the second type of data is not to be transmitted.

30. The non-transitory computer-readable medium of claim 22, wherein the transmitting the second type of data using the second type of PRACH resource further comprises:
  select a duration for the transmitting the second type of data based on a location of the UE in a cell of the BS.

* * * * *